(12) United States Patent
Andrews

(10) Patent No.: US 12,012,079 B1
(45) Date of Patent: Jun. 18, 2024

(54) AUTOMATIC CATTLE TRAILER WASH SYSTEM

(71) Applicant: QUALITY INTERSTATE SERVICES, L.L.C., Hillsdale, IL (US)

(72) Inventor: Harley Andrews, East Moline, IL (US)

(73) Assignee: QUALITY INTERSTATE SERVICES, L.L.C., Hillsdale, IL (US)

( * ) Notice: Subject to any disclaimer, the term of this patent is extended or adjusted under 35 U.S.C. 154(b) by 0 days.

(21) Appl. No.: 17/921,244

(22) PCT Filed: Jun. 13, 2022

(86) PCT No.: PCT/US2022/033246
§ 371 (c)(1),
(2) Date: Oct. 25, 2022

(87) PCT Pub. No.: WO2023/009227
PCT Pub. Date: Feb. 2, 2023

Related U.S. Application Data

(60) Provisional application No. 63/226,886, filed on Jul. 29, 2021.

(51) Int. Cl.
*B60S 3/04* (2006.01)
*B08B 3/02* (2006.01)
*B08B 13/00* (2006.01)

(52) U.S. Cl.
CPC .............. *B60S 3/04* (2013.01); *B08B 3/024* (2013.01); *B08B 13/00* (2013.01); *B08B 2203/027* (2013.01)

(58) Field of Classification Search
None
See application file for complete search history.

(56) References Cited

U.S. PATENT DOCUMENTS

| 5,320,121 A | 6/1994 | Alexanian |
| 5,858,111 A | 1/1999 | Marrero |

FOREIGN PATENT DOCUMENTS

| KR | 102026809 B1 | 11/2019 |
| KR | 102199200 B1 | 1/2021 |

OTHER PUBLICATIONS

ISR Search Report for PCT/US2022/033246, dated Sep. 27, 2022 (10 pages).
International Preliminary Report on Patentability for PCT/US2022/033246, dated Aug. 2, 2024 (7 pages).

*Primary Examiner* — Eric W Golightly
(74) *Attorney, Agent, or Firm* — NYEMASTER GOODE, P.C.

(57) ABSTRACT

A wash system for a cattle trailer having an automatic side car having a base with a horizontal rail, a support wheel on the horizontal rail driven by a locator motor, a vertical rail supported on the horizontal rail, a shuttle vertically movable on the vertical rail driven by a shuttle motor. The system includes a wand having a nozzle at one end slidably disposed on the shuttle and driven by a wand motor. The system includes a vision system having a camera on the shuttle, a point depth sensor, and a control box electrically connected to the vision system, the locator motor, the shuttle motor, and the wand motor to accept information from the vision system and use the information accepted from the vision system to direct the locator motor, the shuttle motor, and the wand motor to locate the nozzle within the cattle trailer.

19 Claims, 13 Drawing Sheets

AUTOMATIC CATTLE TRAILER WASH SYSTEM

CROSS-REFERENCE TO RELATED APPLICATIONS

The present application claims the benefit of priority to International Patent Application No. PCT/US2022/033246, filed Jun. 13, 2022, entitled "AUTOMATIC CATTLE TRAILER WASH SYSTEM," and U.S. Provisional Patent Application No. 63/226,886, filed Jul. 29, 2021, entitled "AUTOMATIC CATTLE TRAILER WASH SYSTEM," the entire disclosures of which are hereby incorporated by reference in their entireties.

BACKGROUND

The wash process for cattle trucks currently is a manual process. The process uses operators using hand held hoses to spray the inside and outside of the cattle truck to ensure cleaning on both sides of the trailer of a cattle truck.

SUMMARY

One aspect of the present disclosure includes a wash system for a cattle trailer having an automatic side car having a base with a horizontal rail, a support wheel on the horizontal rail driven by a locator motor, a vertical rail supported on the at least one horizontal rail, a shuttle vertically movable on the vertical rail driven by a shuttle motor. The system includes a wand having a nozzle at one end slidably disposed on the shuttle and driven by a wand motor. The system includes a vision system having a camera on the shuttle, a point depth sensor, and a control box electrically connected to the vision system, the locator motor, the shuttle motor, and the wand motor to accept information from the vision system and use the information accepted from the vision system to direct the locator motor, the shuttle motor, and the wand motor to locate the nozzle within the cattle trailer.

Another aspect of the present disclosure includes a method of washing a cattle trailer including driving into a wash area, activating the automatic wash system, positioning a side car at a distance from the front of the cattle trailer by sensing the location of the trailer by a vision system disposed on the side car and activating a locating motor to urge a support wheel disposed on the side car to a predetermined position, positioning a vertical position of a wand by sensing the location of a hole on the side wall of the cattle trailer using the vision system, and activating a shuttle motor to urge a shuttle to a predetermined vertical position, positioning a lateral position of a nozzle of the wand by sensing the location of a hole on the side wall of the cattle trailer using the vision system, and activating a wand motor to urge the wand to a predetermined lateral position. Then spraying pressurized water out of the nozzle and against the inside of the cattle trailer.

These and other aspects, objects, and features of the present disclosure will be understood and appreciated by those skilled in the art upon studying the following specification, claims, and appended drawings.

DETAILED DESCRIPTION

Figure 1:
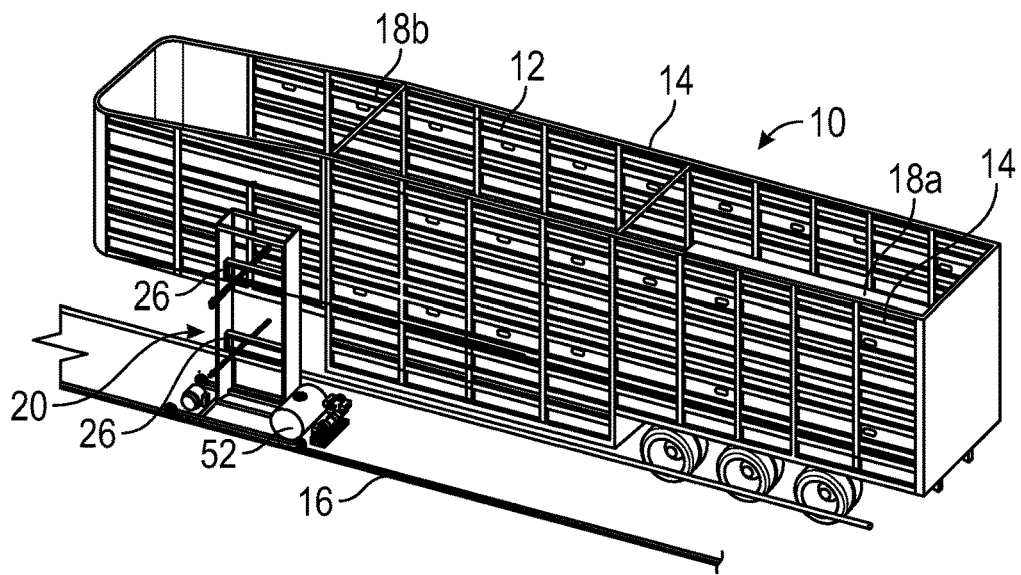
FIG. 1 is an isometric view of a side car and trailer of an embodiment.
Figure 2:
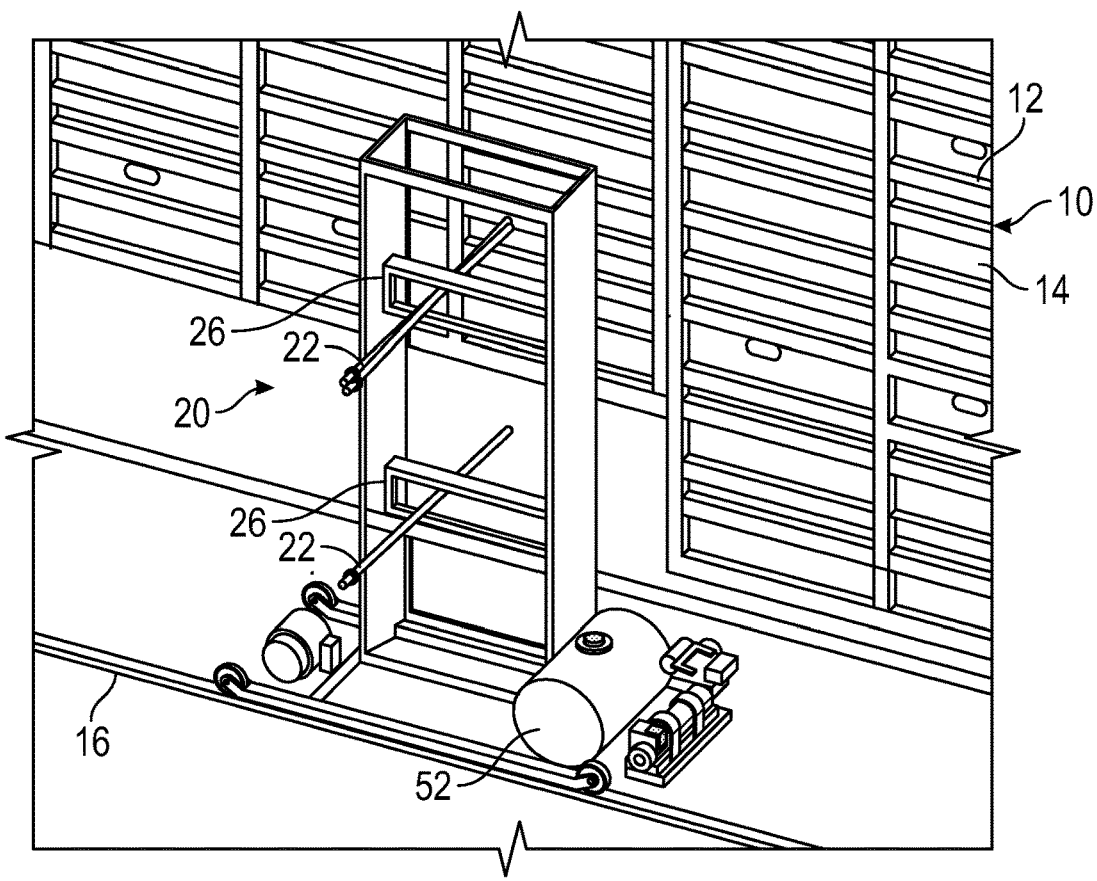
FIG. 2 is a closer view of a side car in relationship to a trailer.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. The terms "cattle truck" and "cattle trailer" is used within the disclosure but is not meant to be limiting and may be used interchangeably with "livestock trailer" or any other name known in the art.

The device disclosed automates the washing of both the inside and outside of the side walls 14 of a cattle truck or trailer 10. The cattle trucks include side walls 14 having holes 12 that allow for airflow through the cattle truck. According to the disclosure, at least about 80% of the side wall wash process is automated as measured by wash surface area, leaving only about 20% or less to be washed by a human operator.

The cattle trucks 10 typically are about 13'6" high (±3"), about 8'6" wide (±3") and up to 9'8" with mirrors, and up to about 53' long. The lower height of the wash surface can be as low as 2' above ground level. The cattle trailer wash can accommodate holes 12 in the truck side walls 14 as small as 3" by 4", and may accommodate single and double decker trucks 10. Objects inside the truck 10 like internal walls and cattle gates 18a and 18b may be accommodated as well.

The washing process is intended to be performed in less than 30 minutes from when the truck is in position and the operator presses the start button (not shown). Trucks may enter one end of the wash area and exit from the other end as shown in FIG. 1 such that there is no need for the truck to back up. A signal (not shown) may be provided to the driver to indicate when the wash is in progress and when the wash is complete. The wash may use hot water (165° F.) without detergents, and comply with the ISO 14121 (Safety of Machinery) standard.

As shown in FIG. 1, a cattle trailer or cattle truck 10 is driven into the wash area with at least one side car 20, preferably at least two side cars 20 (second side car not shown), one on either side of the trailer 10. The side cars 20 may move independently along the full length of the truck's trailer 10. An inverted-V rail 16 may be installed on one or both sides of the wash area, covering the full length of the trailer 10. The rails 16 support the weight of the side cars and ensure their alignment with the trailer 10.

Each side car 20 may have at least one, but preferably four V-groove wheels 36, mounted on two axes, which correspond to and roll on the inverted-V rails. One of the V-groove wheel axes on each side car may be driven by an electric motor mounted on the side car via a chain drive, a belt drive, or the like. Internal wash is achieved by inserting wands 22 into the interior of the trailer 10 via the trailer's holes 12 in the trailer side walls 14. External wash is achieved using six rotating sprinklers with two nozzles each.

Figure 3:
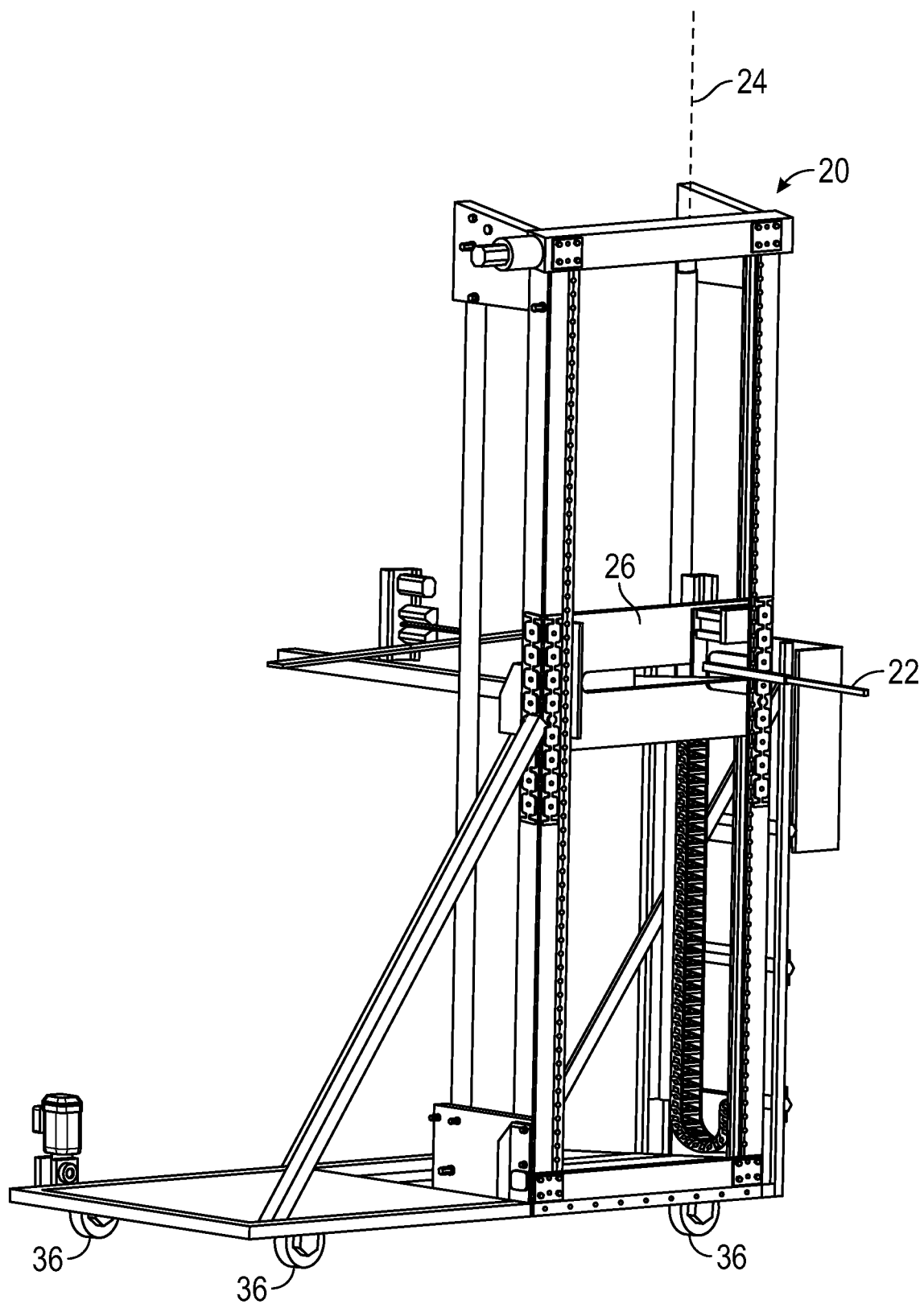
FIG. 3 is an isometric view of a side car of an embodiment.
Figure 4:
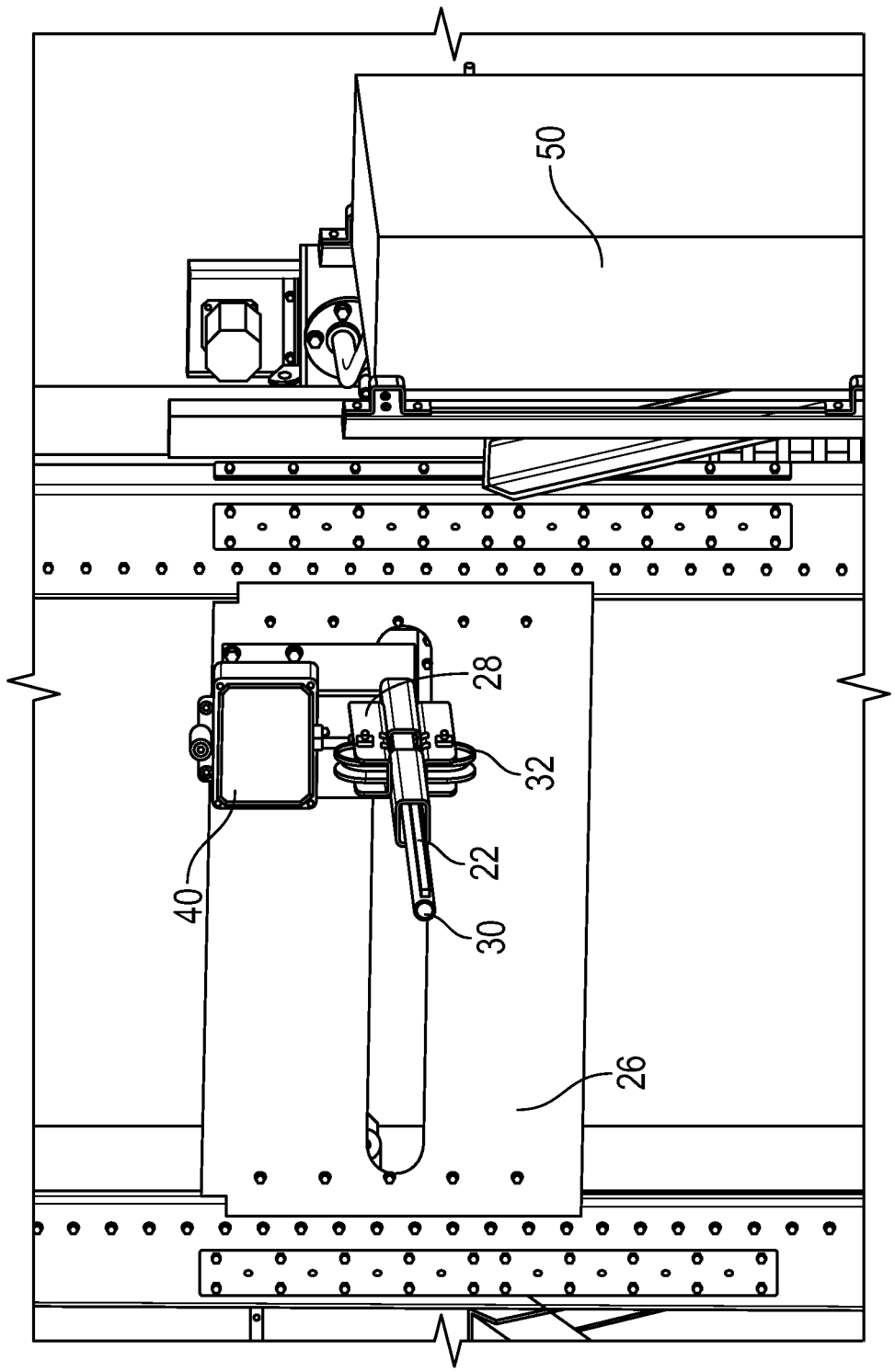
FIG. 4 is a view of a shuttle of the side car of an embodiment.
Figure 5:
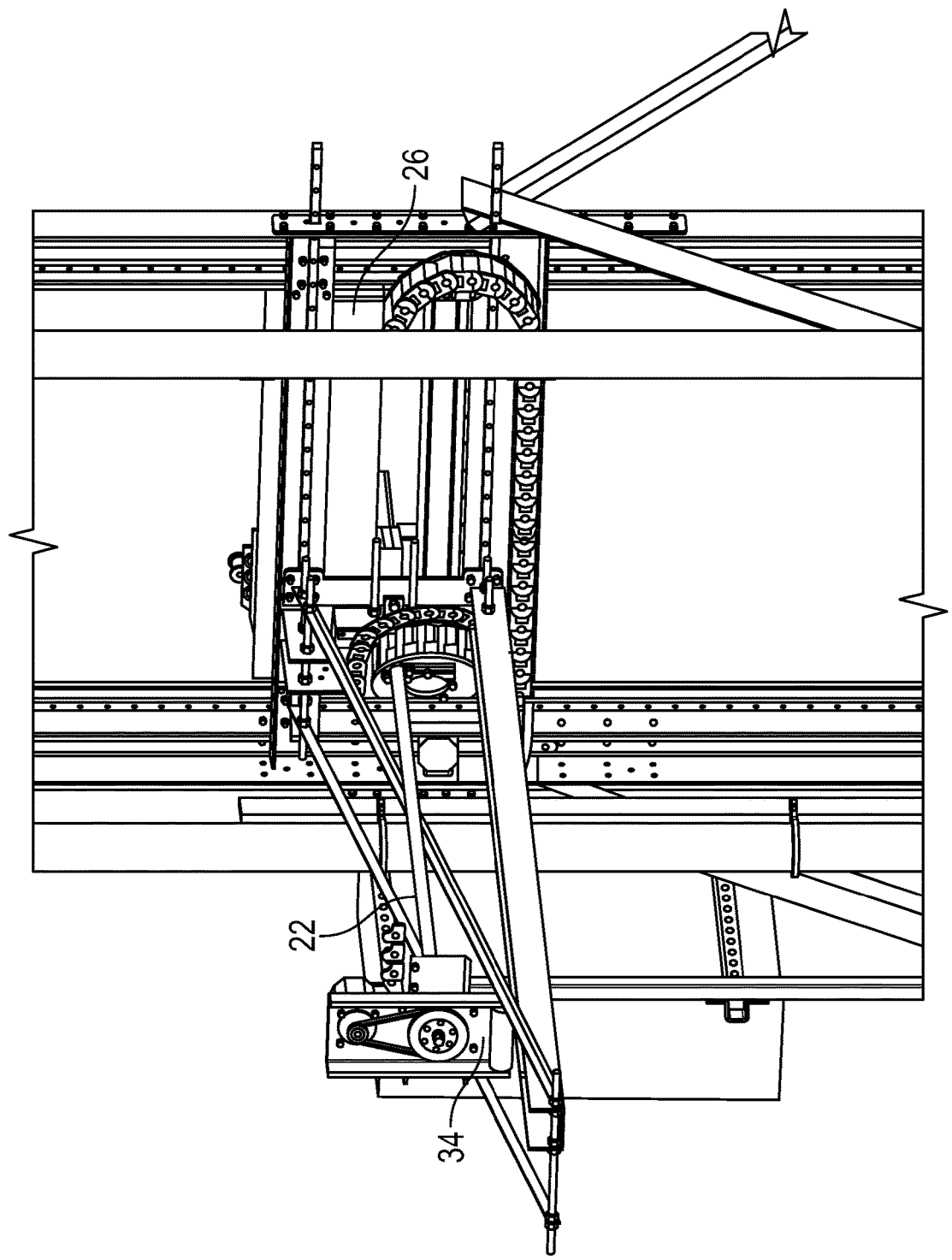
FIG. 5 is a rear isometric view of the shuttle of the side car of an embodiment.

As shown in FIG. 3, each side car 20 may have a single vertical axis 24 with at least one shuttle 26. In an embodiment, there may be two shuttles 26. The shuttles 26 may be driven by a pulley and gear motor and are capable of moving independently to the extent that they are mounted on the same vertical supports. The shuttles 26 cover a vertical range of about 11'.

Each of the vertical shuttles 26 has a horizontal wand 22 capable of being driven horizontally in and out of the trailer over a range of about 8'. Each shuttle 26 can also move its wand along the length of the trailer over a distance of about 2' to allow more precise wand 22 positioning than that provided by the overall side car 20 movement. Each wand 22 may be supported by a diamond shaped (non-rotating) support structure 28 housing a circular rotating pipe, which is the wand 22. The rotating pipe or wand 22 delivers the wash fluid via a nozzle 30 mounted on the end of the rotating pipe 22. The horizontal movement of the wand 22 in and out of the trailer 10 is driven by at least one friction wheel 32 with a gear motor and the circular motion of the wand 22 is driven by an electric motor 34 located on a back side of the shuttle 26.

In the embodiment with a side car 20 on either side of the trailer 10, the side cars 20 preferably operate independently from one another. Each side car 20 has its own onboard vision system, control system and water delivery system. The vision system on each side car 20 consists of a 2D camera, a 3D camera and two laser depth sensors. The point depth sensors are mounted on the wands 22. The 2D and 3D cameras are mounted inside protective enclosures 40 (cameras not specifically shown) to make sure they stay clean during operation and to allow washing of the system itself during maintenance. These enclosures 40 are sealed to the environment and allow line of sight to the truck via a transparent pane of plastic. An actuated hatch of the enclosure 40 closes over the view port in such a way as to avoid debris build up and damage to the cameras. The hatch is opened only momentarily before the insertion of the nozzle (s) to capture the necessary images to guide the robot.

All onboard electronics, controls and drives are contained within an electrical panel 50. The water delivery system mounted on each side car may include a 100 hp water pump skid and a 50-gallon insulated buffer tank 52. The buffer tank 52 serves only to smooth out the demand because a constant supply of wash water is necessary to supply the wands 22. The water pump (not shown) mounted on the side car 20 raises the pressure of the water delivered from the static supply 52. Having the water pump on the side car 20 is beneficial because the pump need not pump the water at pressure through a long water line from a water supply all the way to the side car, but rather the insulated buffer tank may be filled at normal water pressures to keep the insulated buffer tank 52 full, while washing pressure is provided by the on-board water pump from the tank 52 to the wand 22.

Each side car may have an "umbilical cord" (not shown) to deliver electrical power, hot water, and communications. The cabling and water delivery may be managed overhead by a festoon running the full length of the trailer in order to keep the lines from being run over by the side car 20 or any other vehicle operating in the area.

The side car structure is preferably epoxy painted steel enclosed in an aluminum case. This material and coating ensures that the side car or cars are strong enough and stable enough to reliably deliver the high pressure wash water, while still able to withstand the high moisture environment like a trailer wash area without rusting.

The "side car" concept provides a number of benefits in this situation. The wash system provides independent and simultaneous washing on each side of the truck. The wash system minimizes installation requirements by locating electrical and washing services onboard the side car. This location for these services maximizes in-factory integration and testing while minimizing the amount of time and resource required to perform the installation on-site. The system does not require any permanent structures installed at height like gantries or the like which facilitates easier and efficient maintenance as all working parts are accessible from the ground and, if required, the entire side car can be replaced.

FIGS. 6-14 are illustrations of an embodiment of the disclosure. The dimensions of the embodiment may be scaled up and down, or otherwise changed depending on the specific application.

Figure 6:
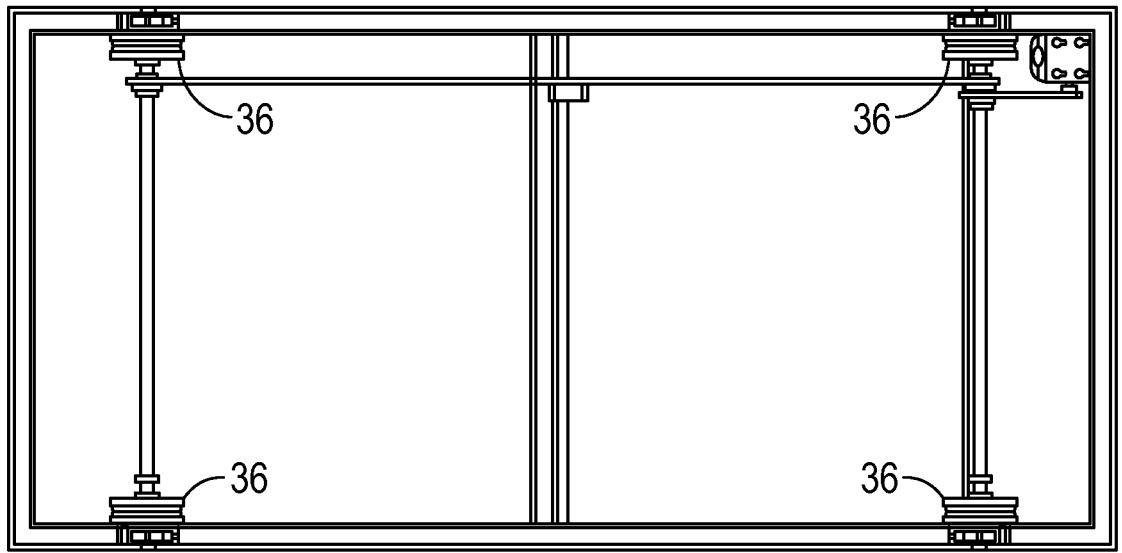
FIG. 6 is an overhead perspective view of the base of the side car of an embodiment.
Figure 6:
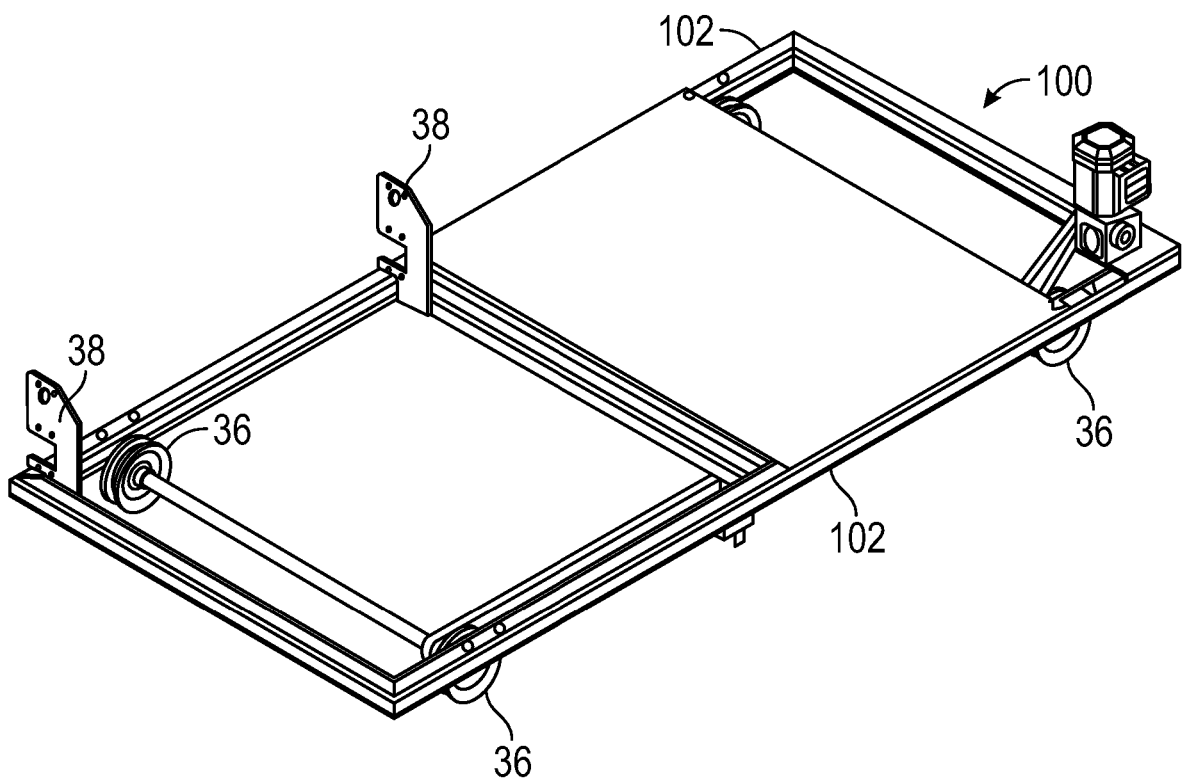

FIG. 6 shown the base 100 of a side car. The base 100 includes horizontal or lateral rails 102, with v-shaped wheels 36 coupled to the horizontal rails. The base 100 may also include brackets 38 that offer support for the vertical rails (detailed below) to be attached.

Figure 8:
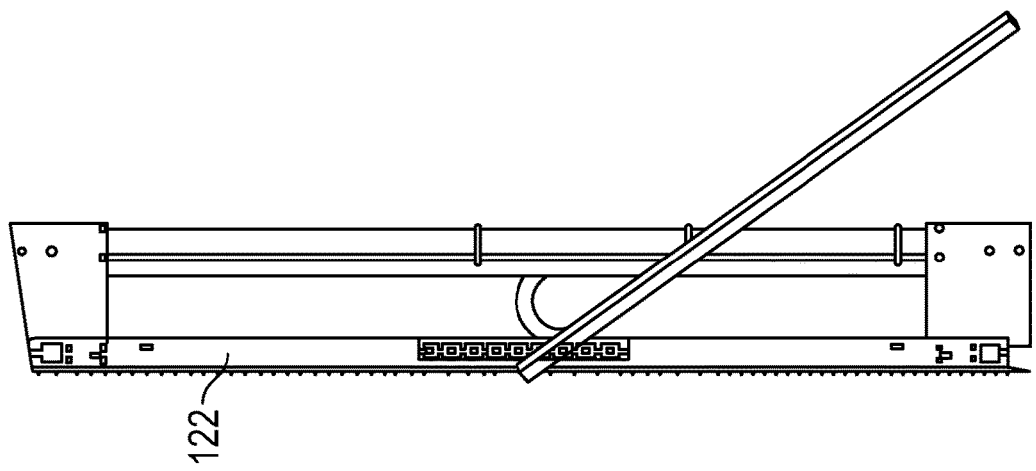
FIGS. 7-9 illustrate the vertical support of the side car of an embodiment.
Figure 7:
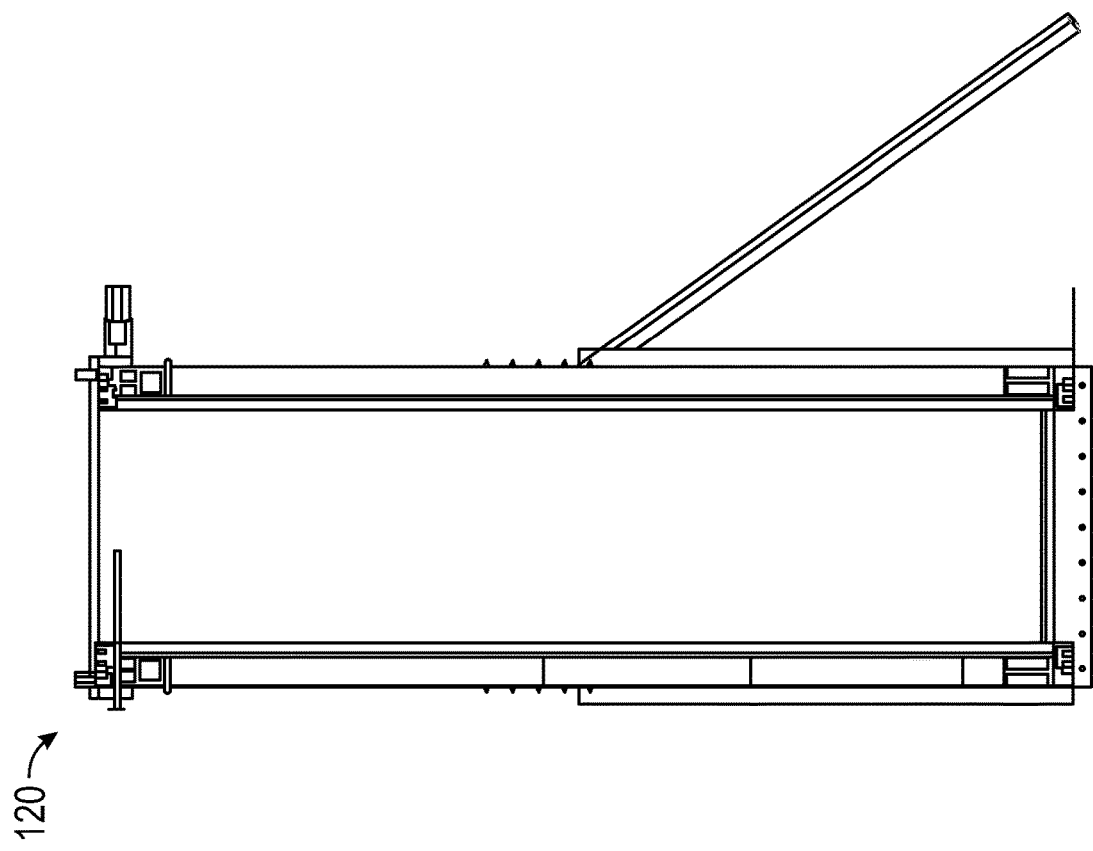
Figure 9:
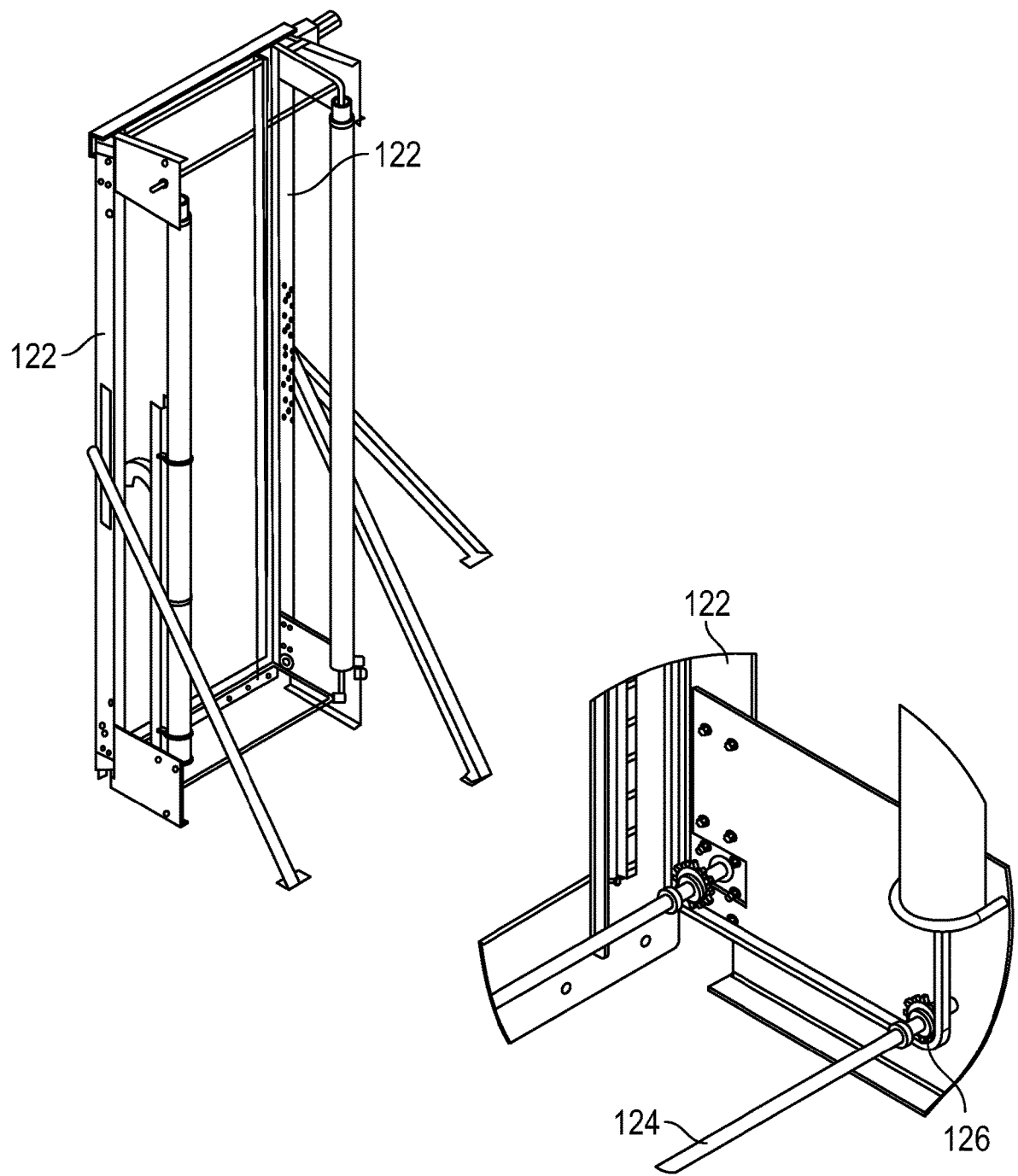
Figure 10:
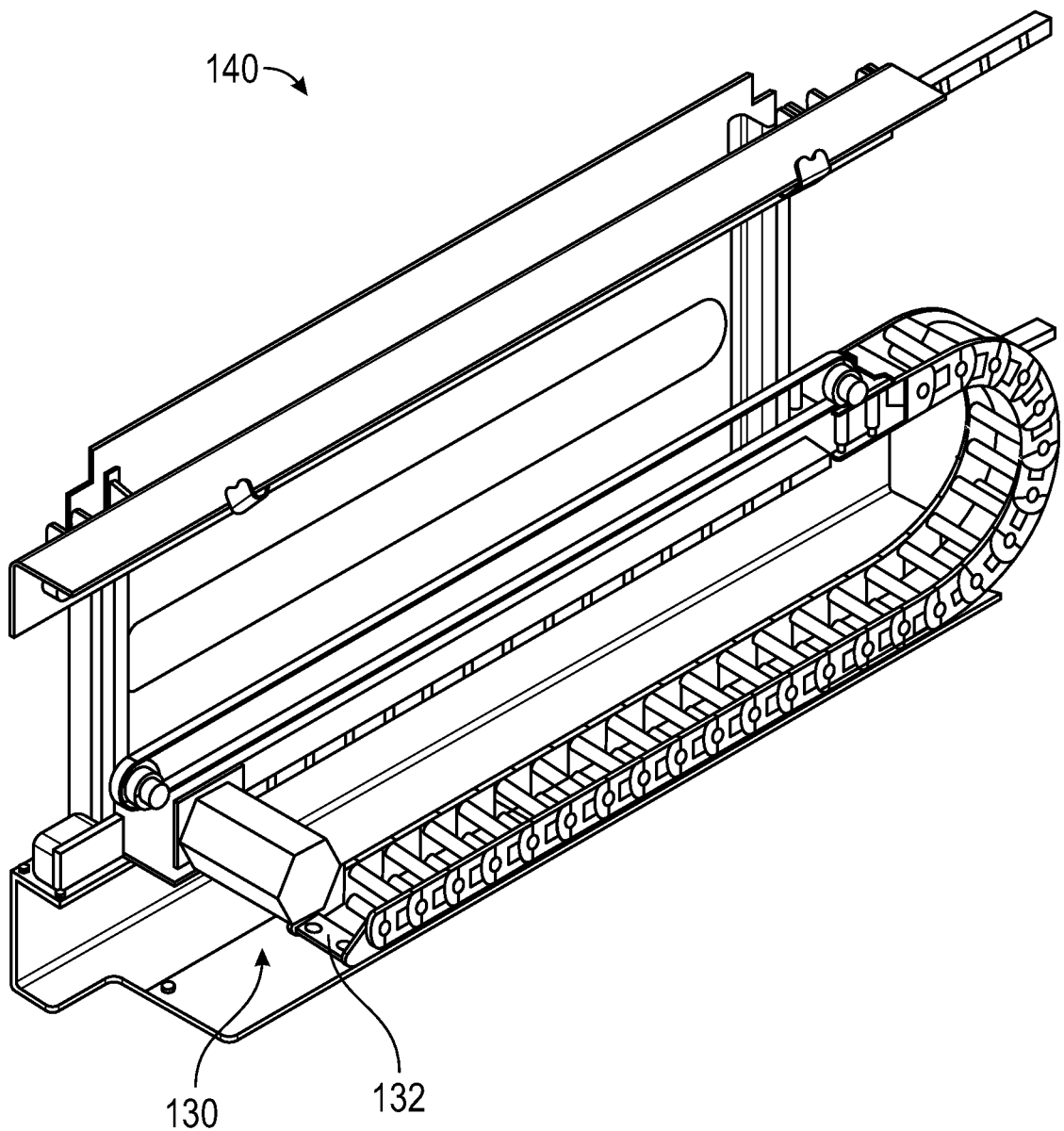
FIG. 10 illustrates the shuttle of the side car of an embodiment.
Figure 11:
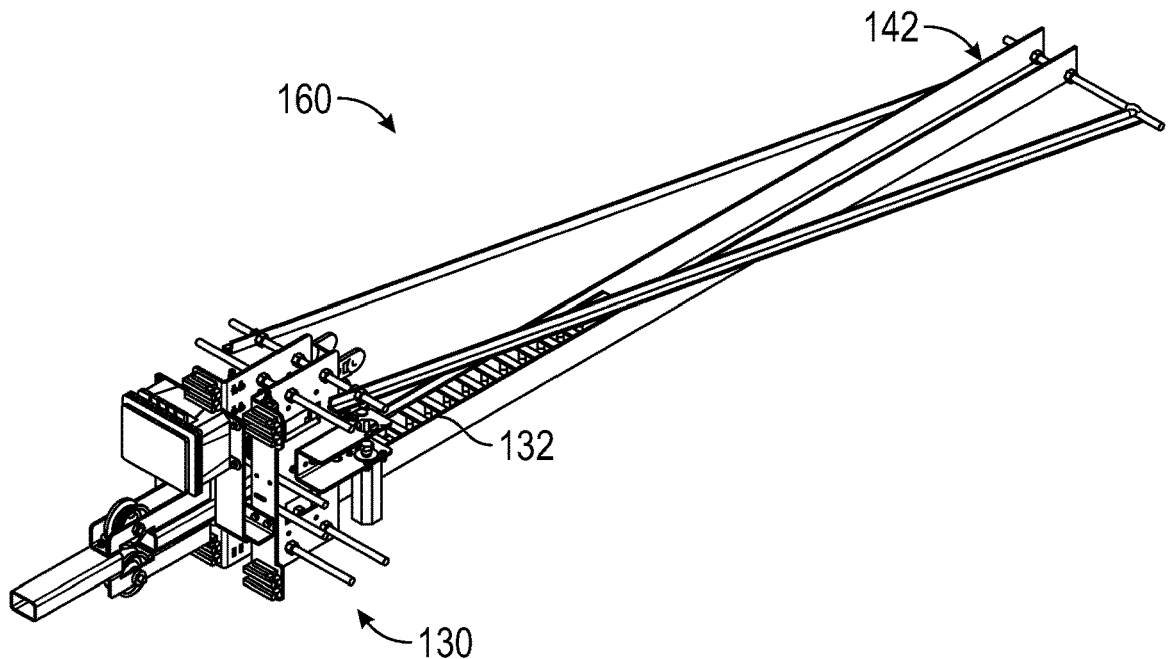
FIG. 11-12 illustrate the wand support of the side car of an embodiment.

FIGS. 7-9 detail the vertical support 120 that is coupled to the base 100. The vertical support 120 may include vertical rails 122 to provide the vertical structure for the wand 22. A pulley system including a chain 124 and sprockets 126 is coupled to a motor (not shown) and attached to the shuttle 26 which moves the shuttle 26 vertically up and down.

Figure 12:
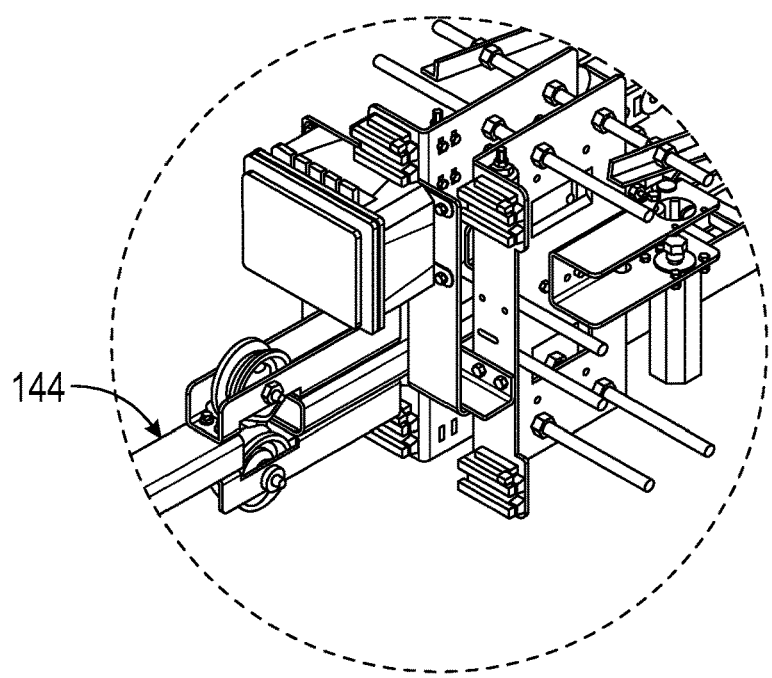

FIG. 12 details the lateral movement system 140 that the wand support (see FIG. 11) couples to. The lateral movement system includes a motor 130 attached to a roller chain 132. The wand support attaches to the roller chain and by can move left and right laterally for fine lateral location.

Figure 13:
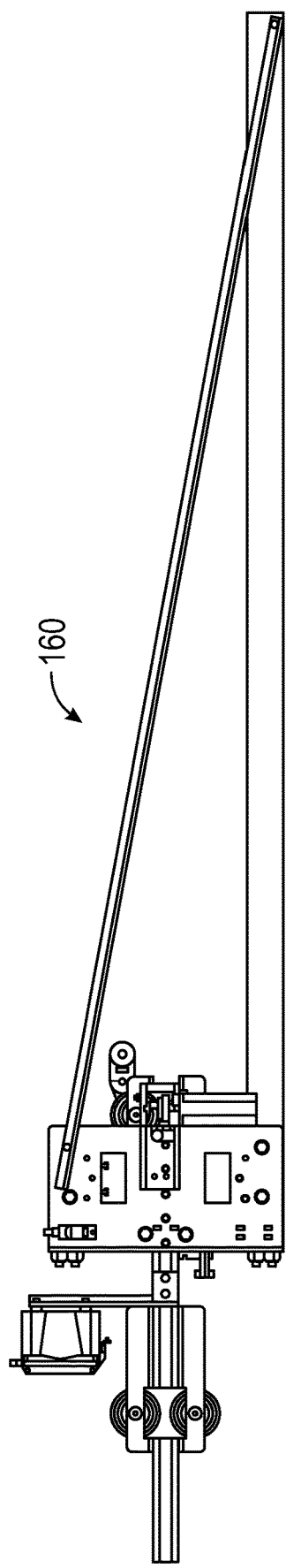
FIG. 13 is a second illustration of the wand support of the side car of an embodiment.
Figure 14:
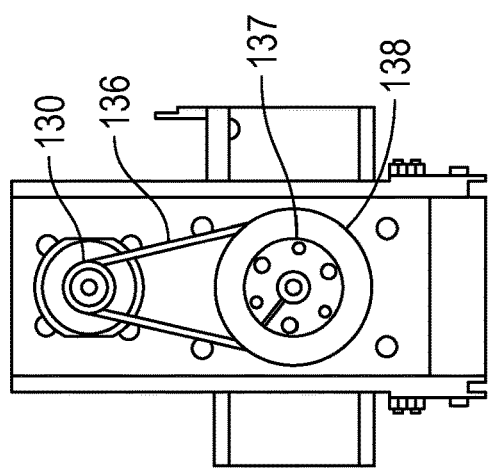
FIGS. 14-16 illustrate the wand of the side car of an embodiment.

FIGS. 13 and 14 are detailed illustrations of the wand support 160. The wand support is slidably attached to the vertical support 120 through the lateral movement system 140. The wand support includes a rear support u-channel 142 and front support 144 that allows the wand 22 (not shown in this figure) to slide fore and aft (into and out of the cattle trailer). Fore/aft movement of the wand 22 is accomplished by coupling a motor 130 to a roller chain 132 coupled to the wand 22.

Figure 15:
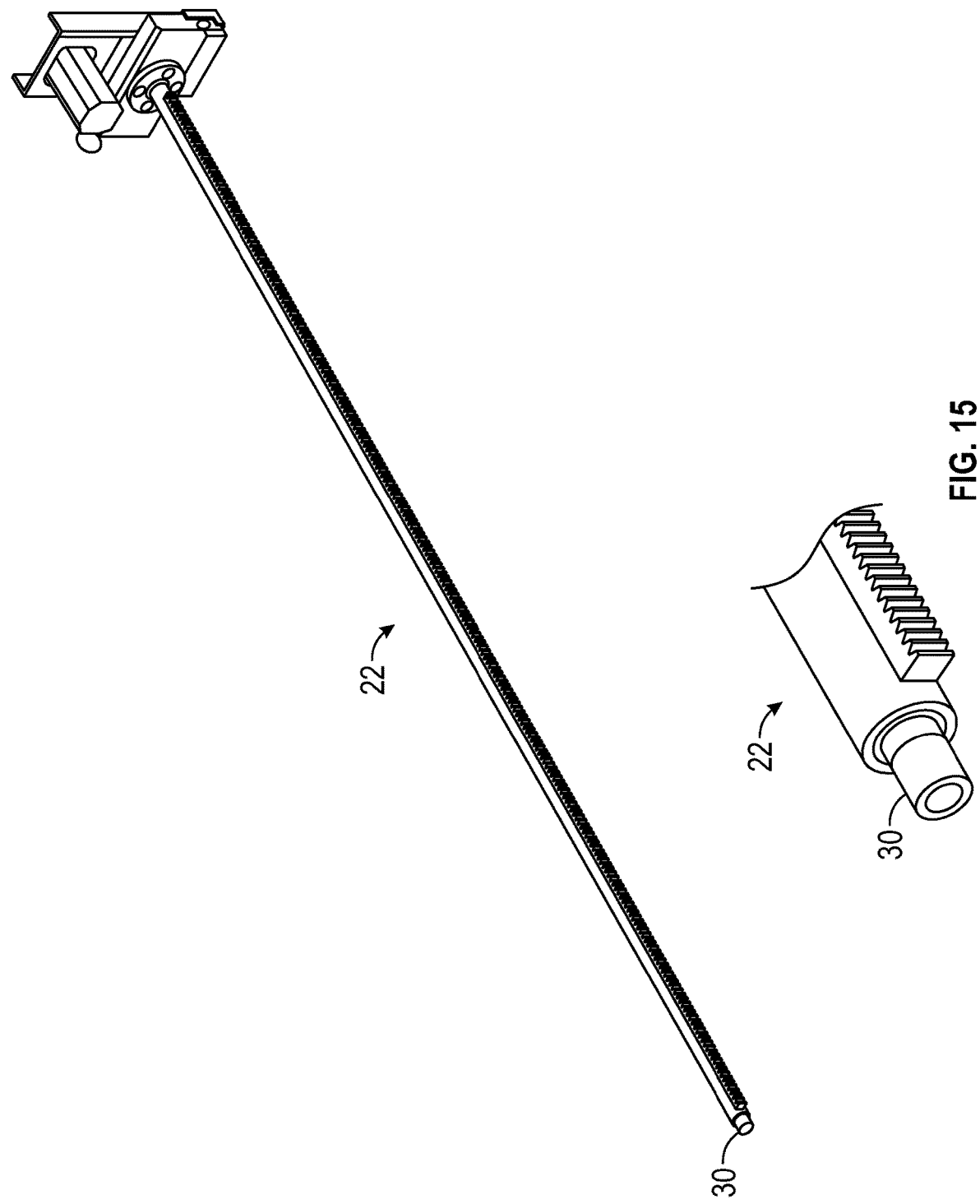

FIGS. 14 and 15 are illustrations of the wand 22 itself. The wand 22 terminates with a nozzle 30 at its terminal end. The wand 22 may be rotated by a motor 130 and a belt and pulley system 136-138 on the rear side of a mounting bracket 150. The wand 22 is coupled to the mounting bracket through a bearing 152.

Figure 16:
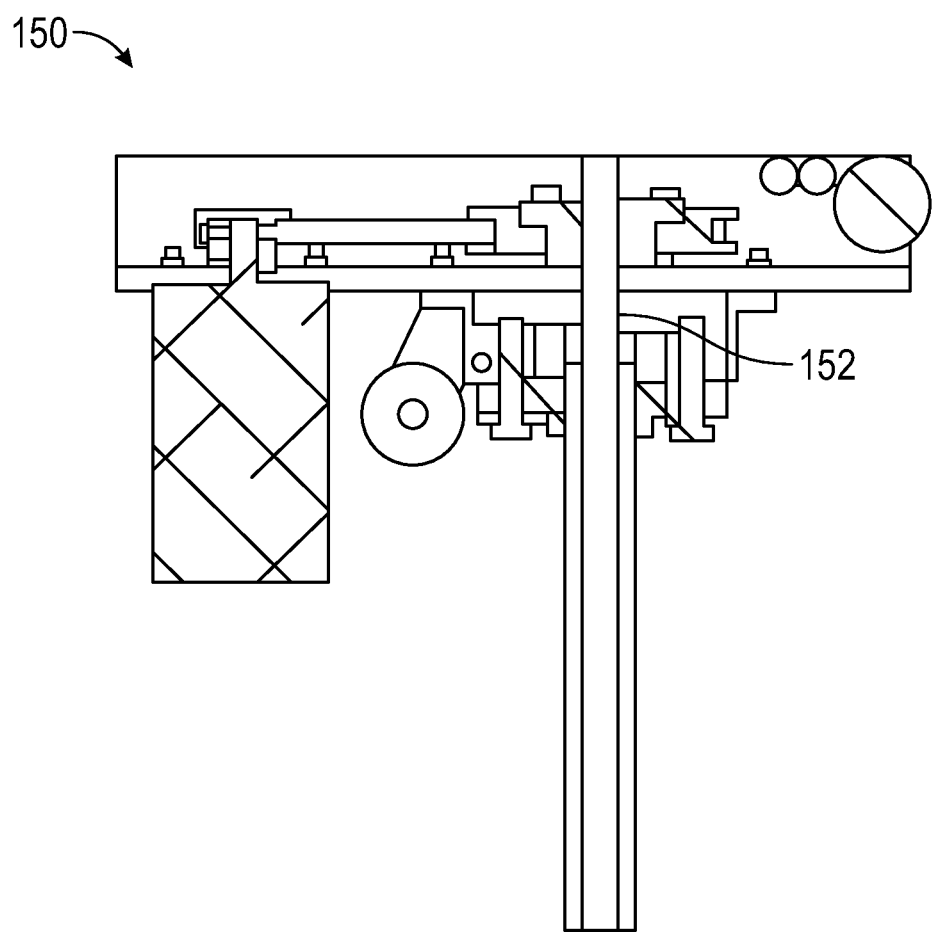
Figure 17:
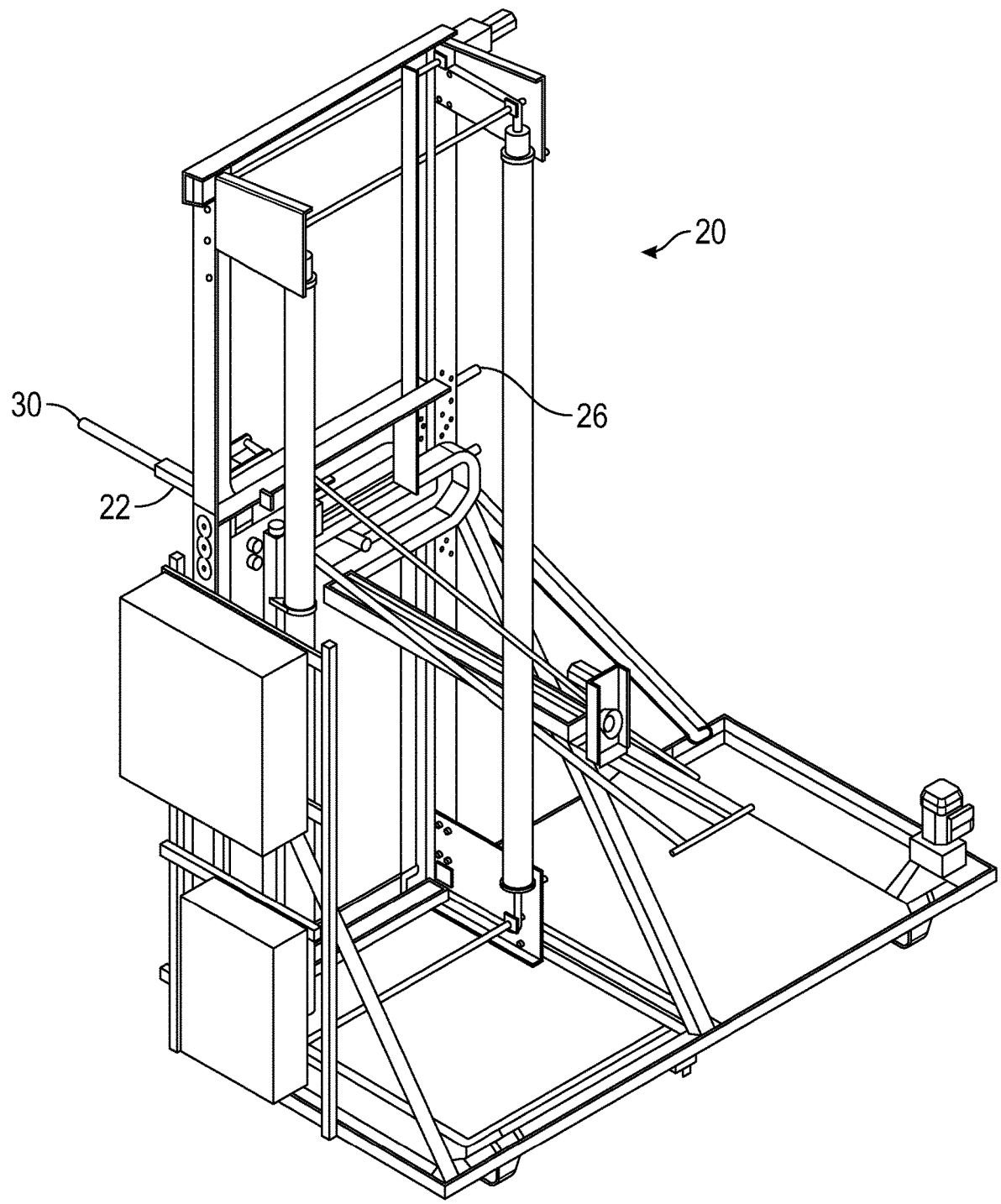
FIG. 17 illustrate the side car of an embodiment.

FIG. 16 is an illustration of the side car assembly 20.

The preferred method of use of the system is as follows. A user pulls their cattle trailer 10 into a designated wash area. Either the user (the driver of the cattle truck) or another person initiates the automatic washing system to begin by pushing a start button on a control board, clicking a button on an app on a mobile device, or by some other way known in the art.

Once the process is initiated, the side car activates the visions system to find a first end of the cattle trailer. The first end may be the front or the rear. The system ensures that the buffer tank 52 is full, and locates itself laterally along the length of the cattle trailer 10 to begin wash. External nozzles begin spraying the outside of the cattle trailer 10. A hole 12 is located in the side wall of the 14 of the cattle trailer 10, and further minute location refinements are made by the side car.

The wand 22 may then be inserted through the hole 12. An on-board water pump begins pumping the water from the buffer tank 52 through the wand 22, and out of the nozzle 30. The nozzle 30 directs the wash water back on the interior of the wall 14 of the trailer 10, in effect washing the inside of the trailer 10.

At the same time, a side car 20 is independently activated on the opposite side of the trailer 10, and goes through the same sequence, washing the other side wall 14 of the trailer 10. Once this sequence is complete, the side car 20 moves a lateral distance down (toward the front or rear, depending on where it started) and begins again. It repeats this sequence until the entire length of the trailer is washed.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A wash system for a cattle trailer, the wash system having an automatic side car, the side car comprising:
   a base, comprising:
   at least one horizontal rail;
   at least one support wheel disposed on at least one of the at least one horizontal rail, the at least one wheel configured to be driven by a locator motor;
   at least one vertical rail supported on the at least one horizontal rail;
   at least one shuttle vertically movable on the at least one vertical rail, the at least one shuttle configured to be driven by a shuttle motor;
   at least one wand having a nozzle at a terminal end of the wand, the nozzle slidably disposed on the at least one shuttle, the at least one wand configured to be driven by a wand motor;
   a vision system comprising:
   at least one camera disposed on the at least one shuttle;
   at least one point depth sensor; and
   a control box electrically connected to the vision system, the locator motor, the shuttle motor, and the wand motor and configured to accept information from the vision system and use the information accepted from the vision system to direct the locator motor, the shuttle motor, and the wand motor to locate the nozzle within the cattle trailer.

2. The wash system of claim 1, wherein the base comprises two horizontal rails.

3. The wash system of claim 1, wherein the wash system comprises at least two vertical rails.

4. The wash system of claim 1, wherein the wash system comprises two independently driven shuttles, each independently driven shuttle having an independently driven wand.

5. The wash system of claim 1, wherein the vision system comprises a 2D camera and a 3D camera disposed on the at least one shuttle.

6. The wash system of claim 5, wherein the at least one point depth sensor is disposed on the nozzle.

7. The wash system of claim 1, further comprising a buffer tank.

8. The wash system of claim 7, wherein the buffer tank is a 50-gallon tank.

9. The wash system of claim 7, wherein the buffer tank is disposed on the base.

10. The wash system of claim 1, wherein the base, the at least one horizontal rail, the at least one vertical rail, and the shuttle are comprised of epoxy painted steel enclosed in an aluminum case.

11. The wash system of claim 1, further comprising a water pump.

12. The wash system of claim 11, wherein the water pump is a 100 hp water pump skid.

13. The wash system of claim 1, further comprising a rotating sprinkler nozzle configured to wash an outside of the cattle trailer.

14. The wash system of claim 1, further comprising a second side car on a second side of the cattle trailer.

15. A method of washing a cattle trailer comprising the steps of:
   driving into a wash area;
   activating an automatic wash system;
   positioning a side car at a distance from a front of the cattle trailer by sensing the location of the trailer by a vision system disposed on the side car and activating a locating motor to urge a support wheel disposed on the side car to a predetermined position;
   positioning a vertical position of a wand by sensing the location of a hole on the side wall of the cattle trailer using the vision system, and activating a shuttle motor to urge a shuttle to a predetermined vertical position;
   positioning a lateral position of a nozzle of the wand by sensing the location of a hole on the side wall of the cattle trailer using the vision system, and activating a wand motor to urge the wand to a predetermined lateral position; and
   spraying pressurized water out of the nozzle and against the inside of the cattle trailer.

16. The method of claim 15, wherein the activating the wash system step is performed by pushing a start button.

17. The method of claim 15, further comprising the step of:
   washing an outside of the cattle trailer by urging water through a rotating sprinkler nozzle toward an exterior wall of the cattle trailer.

18. The method of claim 15, wherein the vision system comprises at least one point depth sensor and a 2D camera and a 3D camera disposed on the shuttle.

19. The method of claim 18, wherein the at least one point depth sensor is disposed on the nozzle.

\* \* \* \* \*